United States Patent
Liu et al.

(10) Patent No.: US 12,298,572 B2
(45) Date of Patent: May 13, 2025

(54) DEVICE, METHOD AND SYSTEM FOR OPTICAL COMMUNICATION WITH A PHOTONIC INTEGRATED CIRCUIT CHIP AND A TRANSVERSE ORIENTED LENS STRUCTURE

(71) Applicant: Intel Corporation, Santa Clara, CA (US)

(72) Inventors: Changhua Liu, Chandler, AZ (US); Pooya Tadayon, Portland, OR (US); Zhichao Zhang, Chandler, AZ (US); Liang Zhang, Chandler, AZ (US); Srikant Nekkanty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 17/359,183

(22) Filed: Jun. 25, 2021

(65) Prior Publication Data
US 2022/0413214 A1    Dec. 29, 2022

(51) Int. Cl.
G02B 6/42    (2006.01)

(52) U.S. Cl.
CPC ......... *G02B 6/4204* (2013.01); *G02B 6/4244* (2013.01); *G02B 6/4245* (2013.01); *G02B 6/425* (2013.01); *G02B 6/428* (2013.01)

(58) Field of Classification Search
CPC G02B 6/12–126; G02B 6/30; G02B 6/42–43; G02B 2006/12035–12197; G02B 27/00–648
See application file for complete search history.

(56) References Cited

U.S. PATENT DOCUMENTS

| 4,755,014 A | 7/1988 | Stoll et al. |
| 4,756,591 A | 7/1988 | Fischer et al. |

(Continued)

FOREIGN PATENT DOCUMENTS

| DE | 19613755 | 10/1997 |

OTHER PUBLICATIONS

Carroll, L. et al., "Photonic Packaging: Transforming Silicon Photonic Integrated Circuits into Photonic Devices", Applied Sciences 2016, vol. 6, No. 426, www.mdpi.com/journal/applsci, 21 pages.

(Continued)

*Primary Examiner* — Daniel Petkovsek
*Assistant Examiner* — Emma R. Oxford
(74) *Attorney, Agent, or Firm* — Essential Patents Group, LLP

(57) ABSTRACT

Techniques and mechanisms for facilitating horizontal communication with a photonic integrated circuit (PIC) chip, and a lens structure which is optically coupled thereto. In an embodiment, a PIC chip comprises integrated circuitry, photonic waveguides, and integrated edge-oriented couplers (IECs) which are coupled to the integrated circuitry via the photonic waveguides. The PIC chip forms respective first divergent lens surfaces of the IECs, which are each at a respective terminus of a corresponding one of the photonic waveguides. A lens structure, which is adjacent to the IECs, comprises a second divergent lens surface having an orientation which is substantially orthogonal to the respective orientations of the first divergent lens surfaces. In another embodiment, an edge of the PIC chip forms one or more recess structures, and the lens structure comprises one or more tenon portions which each extends into a respective recess structure of the one or more recess structures.

16 Claims, 7 Drawing Sheets

(56) References Cited

U.S. PATENT DOCUMENTS

| | | | |
|---|---|---|---|
| 5,084,895 A | 1/1992 | Shimada et al. | |
| 6,810,190 B2 | 10/2004 | Manolatou | |
| 7,352,940 B2 | 4/2008 | Charters et al. | |
| 7,643,710 B1 | 1/2010 | Liu | |
| 8,319,237 B2 | 11/2012 | Liu | |
| 9,229,169 B2 | 1/2016 | Doany et al. | |
| 9,664,858 B2 | 5/2017 | Mohammed et al. | |
| 9,698,564 B1 | 7/2017 | Shubin et al. | |
| 9,971,089 B2 | 5/2018 | Zhang et al. | |
| 12,164,147 B2 * | 12/2024 | Liu | G02B 6/12004 |
| 2002/0034834 A1 * | 3/2002 | Verdiell | G02B 6/4272 |
| | | | 438/22 |
| 2002/0197010 A1 * | 12/2002 | Kato | C07K 14/37 |
| | | | 385/74 |
| 2004/0028371 A1 | 2/2004 | Ota et al. | |
| 2004/0173862 A1 | 9/2004 | Oohara et al. | |
| 2005/0048409 A1 | 3/2005 | Elqaq et al. | |
| 2005/0105853 A1 | 5/2005 | Liu et al. | |
| 2005/0175306 A1 | 8/2005 | Chong et al. | |
| 2005/0271326 A1 | 12/2005 | Luo | |
| 2008/0252620 A1 * | 10/2008 | Shimizu | G06F 3/0421 |
| | | | 385/33 |
| 2010/0007633 A1 | 1/2010 | Juni | |
| 2013/0279844 A1 | 10/2013 | Na et al. | |
| 2015/0362739 A1 | 12/2015 | Zambuto et al. | |
| 2016/0139338 A1 | 5/2016 | Sheu | |
| 2017/0242208 A1 * | 8/2017 | Lee | G02B 6/424 |
| 2019/0172821 A1 | 6/2019 | Yim | |
| 2019/0339466 A1 | 11/2019 | Heck et al. | |
| 2022/0011528 A1 * | 1/2022 | Fujimura | G02B 6/4212 |
| 2022/0413210 A1 * | 12/2022 | Liu | G02B 6/12004 |
| 2022/0413214 A1 | 12/2022 | Liu et al. | |

OTHER PUBLICATIONS

Marchetti, R. et al., "Coupling strategies for silicon photonics integrated chips", Photonics Research, vol. 7, No. 2, pp. 201-239 (2019).

Mu, X. et al., "Edge Couplers in Silicon Photonic Integrated Circuits: A Review", Applied Sciences 2020, vol. 10, No. 1538, 29 pages.

Vivien, L. et al., "Off-Chip Coupling from: Handbook of Silicon Photonics", CRC Press; https://www.routledgehandbooks.com/doi/10.1201/b14668-4; published online on: Apr. 26, 2013.

Extended European Search Report for European Patent Application No. 22162068.5, dated Sep. 8, 2022.

Extended European Search Report for European Patent Application No. 22164505.4, dated Nov. 4, 2022.

Minot, M., et al., "A New Guided-Wave Lens Structure", Journal of Lightwave Technology, Dec. 8, 1990, vol. 8, No. 12, New York, USA.

* cited by examiner

DEVICE, METHOD AND SYSTEM FOR OPTICAL COMMUNICATION WITH A PHOTONIC INTEGRATED CIRCUIT CHIP AND A TRANSVERSE ORIENTED LENS STRUCTURE

RELATED APPLICATIONS

This patent application is related to concurrently filed U.S. patent application Ser. TBD, titled "DEVICE, METHOD AND SYSTEM FOR OPTICAL COMMUNICATION WITH A WAVEGUIDE STRUCTURE AND AN INTEGRATED OPTICAL COUPLER OF A PHOTONIC INTEGRATED CIRCUIT CHIP," filed on Jun. 25, 2021, which is assigned to the assignee of the presently claimed subject matter and herein incorporated by reference.

BACKGROUND

1. Technical Field

This disclosure generally relates to photonic devices and more particularly, but not exclusively, to structures which facilitate optically coupling of a lens structure to an edgewise oriented lens formed by a photonic integrated circuit chip.

2. Background Art

In optical communications, information is transmitted by way of an optical carrier whose frequency typically is in the visible or near-infrared region of the electromagnetic spectrum. A carrier with such a high frequency is sometimes referred to as an optical signal, an optical carrier, or a lightwave signal. A typical optical communication network includes several optical fibers, each of which may include several channels. A channel is a specified frequency band of an electromagnetic signal, and is sometimes referred to as a wavelength.

Technological advances today include optical communication at the level of a photonic integrated circuit (PIC) chip. This is because PICs have size advantages that are attractive in computer systems. Optical photonics devices such as lasers, modulators, and detectors are typically fabricated on silicon-on-insulator (SOI) wafers which are subsequently singulated to form PIC chips. Silicon waveguides of a PIC chip are typically designed with submicron cross-sections, allowing dense integration of active and passive devices to achieve higher speed and lower driving power. A grating structure typically serves as an optical mode converter (OMC) to provide optical coupling between a silicon waveguide of a PIC chip and an optical fiber.

As successive generations of semiconductor technologies continue to scale in terms of size, as well as speed and other capabilities, there is expected to be an increasing premium placed on improvements to techniques for providing optical signal communication between different devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
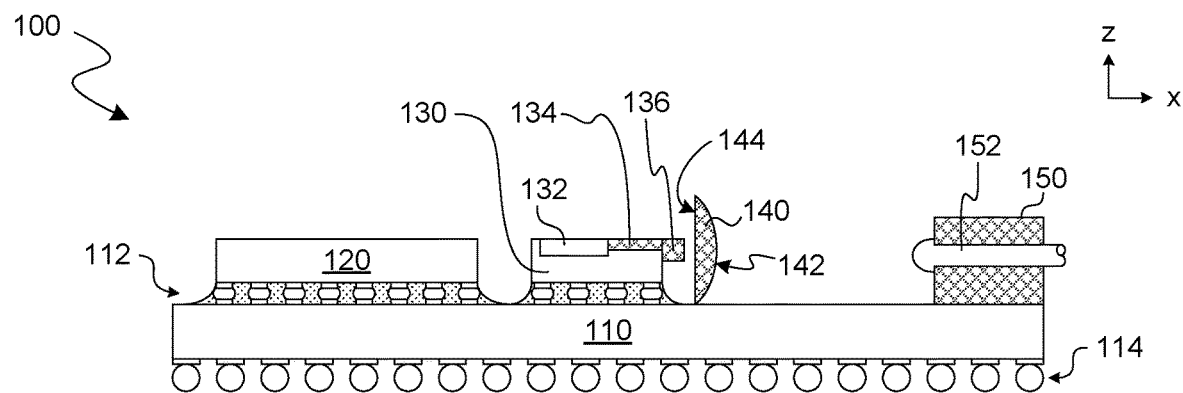
FIG. 1A shows a cross-sectional side view of a packaged device comprising a photonic integrated circuit (PIC) a transverse-oriented lens structure according to an embodiment.

Embodiments discussed herein variously provide techniques and mechanisms for horizontal coupling a first lens structure of a photonic integrated circuit (PIC) chip to another device—such as an optical fiber, or another PIC—via a second lens structure which is distinct from the PIC, and which has an orientation substantially orthogonal to that of the first lens structure. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices comprising a PIC and a lens structure which accommodates optical coupling between another device and an edge-facing semicylindrical lens at the PIC.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Embodiments described herein variously facilitate the provisioning of an assembly which comprises a substrate and a photonic integrated circuit (PIC) chip coupled thereto, wherein a lens structure is adjacent and optically coupled to photonic structures formed by the PIC chip. More particularly, the PIC chip forms one or more integrated optical structures—referred to herein as integrated edge-oriented couplers (IECs)—which are configured to be optically coupled for horizontal signal communication with the lens structure. In this particular context, "horizontal" refers to a direction in parallel with a plane in which one of two opposite sides of a PIC chip extends (e.g., wherein an edge of the PIC chip extends between the two sides).

In various embodiments, an orientation of the lens structure is substantially transverse to that of an IEC, to facilitate the communication of an optical signal—in a direction parallel to a side of the PIC chip—between the IEC and (for example) a corresponding optical fiber or another PIC chip. In the context of lens structures, "transverse," "transverse-oriented," and related terms variously refer herein to the characteristic of two lens structures each corresponding to a different respective one of two vergence planes which are substantially orthogonal to one another. A given lens structure is configured to change a vergence—i.e., one of a divergence or a convergence—of light propagating in a given plane (referred to herein as a "vergence plane"). A vergence plane corresponding to a given lens is (for example) a plane in which that given lens is able to provide a greatest amount of vergence change. In one example scenario, vergence change provided by a first lens structure (e.g., an IEC) is to be greatest in a first plane, wherein vergence change provided by a second (transverse-oriented) lens structure is to be greatest in a second plane which is orthogonal to the first plane. For example, a curvature of a first surface of the first lens is greatest in the first plane—e.g., wherein a curvature of a second surface of the second lens is greatest in the second plane.

In various embodiments, a configuration of the IECs and a transverse-oriented lens structure enables beam expansion, mode conversion, and/or other functionality to facilitate photonic signal communication between IECs of a PIC chip and another device (such as a fiber array, or another PIC chip) which is optically coupled to said PIC chip. In providing such an assembly, some embodiments variously improve the ease, efficiency and accuracy with which a PIC chip is optically coupled to said other device. Additionally or alternatively, such embodiments efficiently provide a low (z-dimension) profile solution for communicating optical signals to and/or from a packaged device.

In some embodiments, a PIC chip is of a silicon on insulator (SOI) type—e.g., comprising an upper layer of a semiconductor material, an underlayer which, for example, comprises the same (or another) semiconductor material, and a layer of a buried oxide between the upper layer and the underlayer. The upper layer comprises silicon and/or the buried oxide comprises silicon dioxide, for example. In one such embodiment, a portion of the upper layer is removed to form one or more structures which facilitate the alignment of, and/or mechanical support for, a transverse-oriented lens structure in proximity to IECs of the PIC chip.

Certain features of various embodiments are described herein with reference to a given IEC of a PIC chip forming a divergent lens surface. In this particular context, "divergent" refers to the characteristic of the lens surface extending out from—e.g., as opposed to recessing into—a given edge (or otherwise edge-facing) surface of a PIC chip. In one illustrative embodiment, a divergent lens surface comprises a continuous convex surface at an edge of a PIC chip. Alternatively, a divergent lens surface comprises a plurality of discrete facets, individual ones of which are each substantially flat—e.g., over a respective transverse length and a respective longitudinal height of the lens surface. In one such embodiment, the plurality of discrete facets are "piecewise convex"—e.g., wherein corners (or other such structures) formed by said facets are variously located along the same convex curve.

Figure 1B:
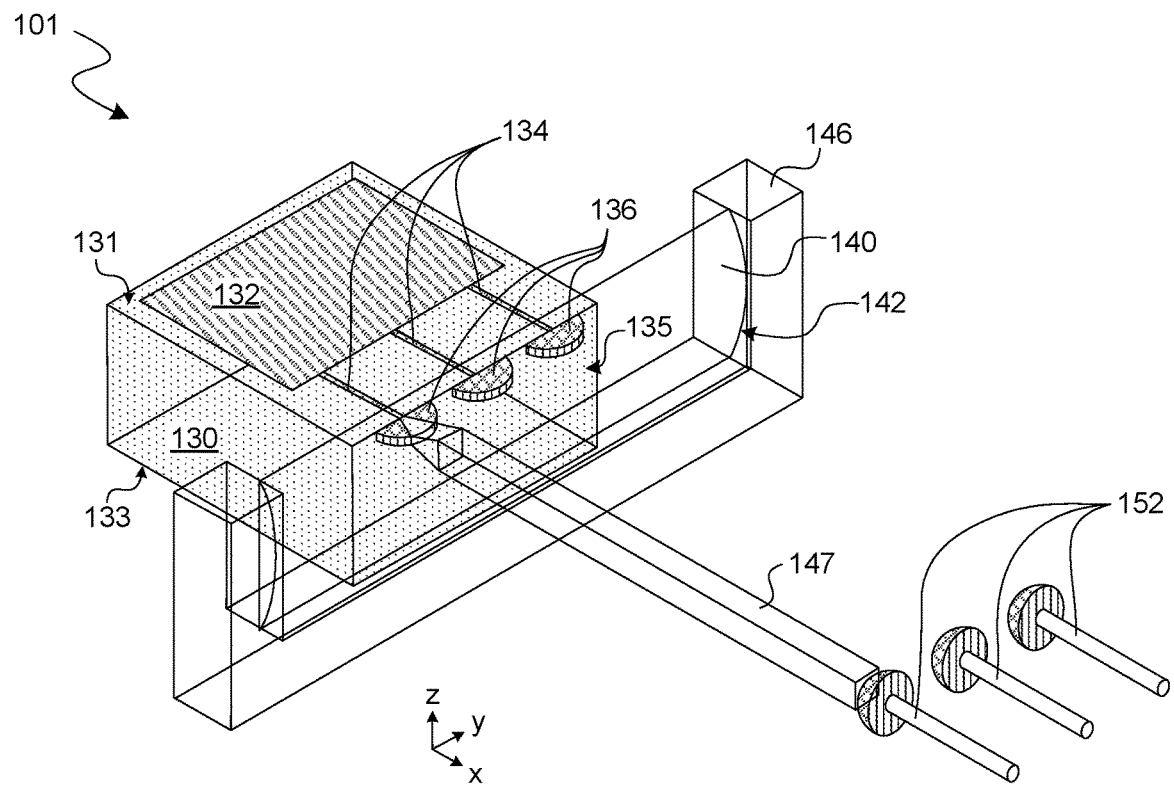
FIG. 1B shows, in a perspective view, structures of the package device represented in FIG. 1A.

FIG. 1A shows features of a device 100 to facilitate optical signal communication between a photonic integrated circuit (PIC) chip and another device via a lens structure according to an embodiment. FIG. 1B shows a perspective view 101 of selected structures of device 100. Device 100 illustrates one example of an embodiment wherein a PIC chip is coupled to a substrate to accommodate edge-wise optical coupling, via a transverse-oriented lens structure, to another device (e.g., including one or more optical fibers, or another PIC chip).

As variously shown in FIGS. 1A, 1B, device 100 comprises a substrate 110 and a PIC chip 130 coupled thereto. Substrate 110 comprises any of various organic, glass, silicon or other suitable substrate materials that (for example) are adapted from conventional packaging techniques. In one such embodiment, substrate 110 functions as a package substrate which is to provide support for PIC chip 130, a transverse-oriented lens structure, and (for example) one or more other integrated circuit (IC) chips—e.g., including the illustrative IC chip 120 shown. By way of illustration and not limitation, PIC 130 and IC chip 120 are variously coupled to the substrate 110 via respective ones of conductive contacts 112, which (for example) are disposed in any of various suitable underfill materials. The conductive contacts 112 comprise any suitable type of structure and materials—whether disposed in multiple layers or combined to form one or more alloys and/or one or more intermetallic compounds—capable of providing electrical communication between substrate 110 and one or more chips including (in this example embodiment) IC chip 120 and PIC chip 130. For example, conductive contacts 112 include copper, aluminum, gold, silver, nickel, titanium, tungsten, as well as any combination of these and/or other metals.

In an embodiment, each of conductive contacts 112 (e.g., a pad, bump, stud bump, column, pillar, or other suitable structure or combination of structures) couples to a corresponding electrically conductive terminal (e.g., a pad, bump, stud bump, column, pillar, or other suitable structure or combination of structures) on a respective chip. Solder (e.g., in the form of balls or bumps) is disposed on the conductive contacts 112 or on terminals of a given chip, which are then used to join PIC chip 130 (and, for example, IC chip 120) to substrate 110—e.g., using a solder reflow process. In some embodiments, the solder material comprises any one or more of tin, copper, silver, gold, lead, nickel, indium, as well as any combination of these and/or other metals. In one such embodiment, the solder also includes one or more additives and/or filler materials to alter a characteristic of the solder (e.g., to alter the reflow temperature). Of course, it should be understood that many other types of interconnects and materials are possible (e.g., wirebonds extending between substrate 110 and one of IC chip 120 or PIC chip 130). Device 100 further comprises a ball grid array 114 positioned proximate a surface of the substrate 110 to provide electrical connections with an underlying device (not shown)—e.g., a printed circuit board.

The one or more IC chips illustrated by IC chip 120 comprise (for example) any of a variety of integrated circuit devices which are suitable for a particular application, such as (but not limited to) a microprocessor, a graphics processor, a signal processor, a network processor, a chipset, etc. In one embodiment, IC chip 120 comprises a system-on-chip (SoC) comprising one or more functional units (e.g., one or more processing units, one or more graphics units, one or more communications units, one or more signal processing units, one or more security units, etc.). However, it should be understood that some disclosed embodiments are not limited to any particular type or class of functionality to be provided with IC chip 120 (or other such integrated circuitry coupled to substrate 110 and PIC chip 130).

PIC chip 130 comprises one or more optical coupler structures—e.g., including the illustrative integrated edge-oriented couplers (IECs) 136 shown—which are formed by an edge facing (for example, substantially vertical) structure of PIC chip 130, such as the illustrative edge 135 shown. PIC 130 further comprises integrated circuitry 132 which, for example, comprises optical signal transit circuitry and/or optical signal receiver circuitry. For example, integrated circuitry 132—e.g., comprising any of a various lasers, modulators, photodetectors and/or other integrated photonics circuits—is formed on an active side 131 of PIC chip 130, wherein an opposite side 133 comprises terminals with which PIC chip 130 is to variously communicate electrical signals (for example, with IC chip 120 and/or other circuitry via substrate 110). In some embodiments, one or more optical signal transit circuits and/or one or more optical signal receiver circuits of integrated circuitry 132 are optically coupled each to a respective one of IECs 136—e.g., via a corresponding one of one or more photonic waveguides of PIC chip 130 (such as the illustrative photonic waveguides 134 shown).

In an example embodiment, a semiconductor substrate of PIC chip 130 is of a silicon on insulator (SOI) type, and comprises (for example) an upper layer of a semiconductor material comprising silicon, an underlayer of the same semiconductor material (or another semiconductor material), and a buried oxide (BOX) layer between the upper layer and the underlayer. Photonic waveguides 134 and/or IECs 136 comprise any of various materials (such as crystalline silicon) which are suitable to communicate an optical signal—e.g., wherein such materials are adapted from conventional PIC chip designs.

In some embodiments, photonic waveguides 134 are coplanar with each other—e.g., wherein the plurality of photonic waveguides 134 each extend in an x-y plane such as one at (or under) a side 131 of PIC chip 130. For example, some or all of photonic waveguides 134 are each within a thickness of material in or on a semiconductor substrate of PIC chip 130—e.g., wherein photonic waveguides 134 are within a top portion of the semiconductor substrate. In one such embodiment, some or all of IECs 136 are coplanar with each other—e.g., wherein IECs 136 each extend in an x-y plane such as one at (or under) side 131.

IECs 136 each terminate a respective one of photonic waveguides 134, and each form a respective lens surface that is divergent (in a y-z plane) and, in some embodiments, is substantially flat (in a x-y plane) over at least a thickness of the semiconductor substrate of PIC chip 130. For example, IECs 136 are each substantially flat at side 131, in some embodiments.

In some embodiments, a given one of IECs 136 forms a convex lens surface which is substantially semicylindrical—e.g., wherein a curvature of the convex lens surface is symmetrical about a primary axis (along the x-dimension) of the convex lens surface. In one such embodiment, the primary axis of the given convex lens surface is in a lateral (y-axis) alignment with an optical axis of a corresponding one of the photonic waveguides 134—e.g., wherein a radius of curvature of the given convex lens surface is equal to or larger than one half of a (y-axis) width of the corresponding photonic waveguide.

Additionally or alternatively, a divergent lens surface of one of IECs 136 comprises a plurality of discrete diffractive edge facets which are symmetrically distributed about a primary axis of said divergent lens surface. In one such embodiment, individual ones of the edge facets are substantially flat over a transverse (y-axis) length and a longitudinal (z-axis) height of the lens surface.

In some embodiments, one or more divergent lens surfaces of IECs 136 each extend into a semiconductor substrate of PIC chip 130. By way of illustration and not limitation, photonic waveguides 134 and IECs 136 each comprise a material including silicon. In one such embodiment, the semiconductor substrate of PIC chip 130 is of a silicon-on-insulator (SOI) type—e.g., wherein PIC chip 130 comprises a layer of silicon dioxide between the material and an underlayer. For example, one or more divergent lens surfaces of IECs 136 each stop at, or within, the layer of silicon dioxide. Additionally or alternatively, one or more divergent lens surfaces of IECs 136 each extend at least partially through the underlayer.

To facilitate edge-wise communication (e.g., horizontal communication in an x-y plane) of one or more optical signals to and/or from PIC chip 130—i.e., via edge 135—device 100 further comprises a transverse-oriented lens structure 140 which is adhered to, or otherwise coupled over, a second region of substrate 110. In an embodiment, a lens surface 144 of lens structure 140—e.g. the lens surface 144 opposite a divergent lens surface 142 of lens structure 140—is adjacent to IECs 136 at edge 135. In the example embodiment shown, device 100 further comprises (or facilitates coupling to) another device, such as the illustrative fiber array housing 150 which has optical fibers 152 extending therein. By way of illustration and not limitation, device 100 supports coupling to a pluggable connector of an optical cable—e.g., wherein the connector includes fiber array housing 150, and wherein optical fibers 152 of the cable extend from device 100 to couple to a remote packaged, or other, device (not shown). Although some embodiments are not limited in this regard, respective distal ends of some or all of optical fibers 152 variously form (or are coupled to) lens structures 154 to facilitate optical coupling with divergent lens surface 142 of lens structure 140.

As variously shown in FIGS. 1A, 1B, divergent lens surface 142 has a transverse orientation, relative to the respective divergent lens surfaces of IECs 136. For example, IECs 136 each correspond to a respective vergence plane which is horizontal—i.e., parallel to the x-y plane shown. In one such embodiment, for each of the respective divergent lens surfaces of IECs 136, a curvature of said divergent lens surface is greatest in a horizontal plane. As a result, IECs 136 are each to provide a respective change in light vergence, where said respective change is greatest in a horizontal (x-y) plane. By contrast, lens structure 140 corresponds to another vergence plane which is parallel to the y-z plane shown (and thus, orthogonal to a vergence plane which corresponds to one or more of IECs 136), wherein lens structure 140 is configured to provide a change in light vergence which is greatest in a vertical (y-z) plane.

In various embodiments, lens structure 140 is optically coupled to facilitate horizontal (x-y) communication of multiple signals (e.g., including the illustrative optical signal 147 shown) each with a respective one of IECs 136 and, for example, each with a respective one of optical fibers 152. For example, divergent lens surface 142 extends horizontally across multiple ones of IECs 136—e.g., wherein an opposite surface 144 of lens structure 140 is substantially flat (for example, in a y-z plane) across some or all of IECs 136.

In an illustrative scenario according to one embodiment, light of optical signal 147 is communicated from a first photonic waveguide of photonic waveguides 134, to a first IEC of IECs 136, and then—via lens structure 140—to a first optical fiber of optical fibers 152. In one such embodiment, divergence of the light of optical signal 147 begins to increase—e.g., at least horizontally—as the light exits the relatively confined first photonic waveguide, and enters the first IEC. The divergent lens surface of the first IEC mitigates horizontal divergence of such light. In some embodiments, vertical divergence of the light begins (or continues) as the light exits the divergent lens surface of the first IEC, and lens structure 140 is configured to subsequently mitigate such vertical divergence.

In some embodiments, lens structure 140 includes, is integrated with, or otherwise coupled to a frame, base, and/or other suitable structure—such as the illustrative support structure 146 shown—which provides mechanical support for the coupling of lens structure 140 to some underlying structure, such as substrate 110. Additionally or alternatively, lens structure 140 is supported by one or more structures formed by a PIC chip, as described elsewhere herein.

In various embodiments, lens structure 140 is formed by processing which, for example, is adapted from conventional photonics fabrication techniques. By way of illustration and not limitation, lens structure 140 comprises any of various light transmissive materials—such as silicon nitride ($Si_3N_4$), silicon oxynitride (SiOxNy), and/or any of a various suitable doped oxides—exhibiting refractive index characteristics which facilitate optical coupling with optical fiber materials. However, it is to be appreciated that some embodiments are not limited to a particular one or more materials of lens structure 140, and the such materials may differ in various embodiments according to implementation-specific details. As described herein, a light transmissive material of lens structure 140 (in some embodiments) is etched, laser ablated or otherwise shaped to form divergent lens surface 142—e.g., wherein divergent lens surface 142 facilitates optical interfacing to communicate multiple optical signals each between a respective one of IECs 136 and a corresponding one of optical fibers 152.

In the example embodiment shown, IECs 136 variously extend from an otherwise flat (in an y-z plane) side 135—e.g., wherein IECs 136 form a portion of edge 135 which is positioned farthest along the x-axis in the direction of transverse-oriented lens structure 140. In an alternative embodiment, edge 135 forms a stepped structure, wherein an upper (along the z-axis) portion of the stepped structure comprises IECs 136, and wherein a lower (along the z-axis) portion of the stepped structure extends past IECs 136—e.g., by at least as much as a (x-axis) depth of a curvature of one of IECs 136—to provide mechanical support for an overlapping portion of lens structure 140. In one such embodiment, the lower portion of the stepped structure forms one or more recesses which are configured each to accommodate a respective extended portion (referred to herein as a "finger portion") of a transverse-oriented lens structure.

Although FIGS. 1A, 1B show device 100 as providing optical coupling between IECs 136 of PIC chip 130 and optical fibers 152, it is to be appreciated that transverse-oriented lens structure 140 (or any of various other transverse-oriented lens structure having features described herein) additionally or alternatively supports optical coupling between IECs of a PIC chip, and any of various other external photonic devices (such as another PIC chip), in different embodiments. For example, some embodiments are variously provided entirely by a PIC chip, or entirely by a packaged device which includes such a PIC chip (e.g., independent of whether a PIC chip of said packaged device is optically coupled to another device via a transverse-oriented lens structure of said packaged device).

Figure 2:
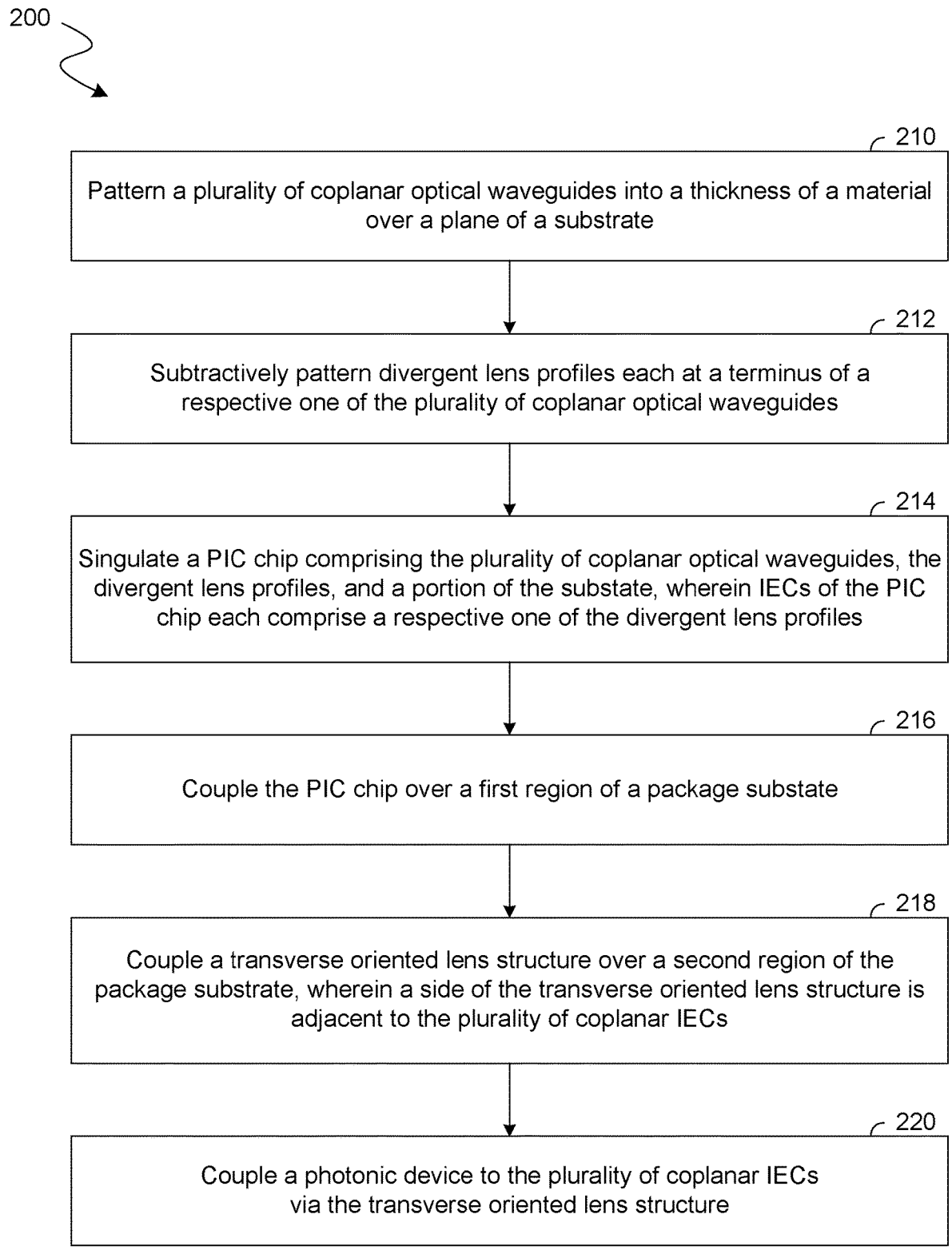
FIG. 2 shows features of a method to facilitate optical coupling between a PIC chip and a transverse-oriented lens structure to according to an embodiment.

FIG. 2 shows features of a method 200 to facilitate optical coupling of a PIC chip to a transverse-oriented lens structure according to an embodiment. Operations such as those of method 200 are performed, for example, to provide structures of device 100.

Although some embodiments are not limited in this regard, method 200 comprises operations to fabricate a PIC chip which comprises a plurality of IECs. For example, as shown in FIG. 2, method 200 comprises (at 210) patterning a plurality of coplanar optical waveguides into a thickness of a material over a plane of a semiconductor substrate. In one illustrative embodiment, a silicon-on-insulator (SOI) substrate comprises an upper layer, an underlayer, and a buried dielectric (e.g. oxide) layer disposed therebetween. The upper layer (and, in some embodiments, the underlayer) comprises crystalline silicon and/or any of various other materials suitable to communicate an optical signal. In one such embodiment, the upper layer is then etched and/or otherwise patterned to form one or more rib waveguide structures therein or thereon. The patterning at 210 involves, for example, wet or dry etching techniques, any of various lithographic processes, or other patterning processes such as ablation, ruling, or other techniques which will be apparent to those skilled in the art.

Method 200 further comprises (at 212) subtractively patterning first divergent lens surfaces each at a terminus of a respective one of the plurality of coplanar optical waveguides. By way of illustration and not limitation, the subtractive patterning comprises deposition of a patterned mask over a region of the substrate where the plurality of coplanar optical waveguides are to end (and, for example, where an edge of a PIC chip is to be subsequently formed). Subsequently, deep reactive ion etching (DRIE) and/or other suitable etch processing is performed through the patterned mask to form one or more lens surfaces. In some embodiments the patterning at 210 is performed concurrently with the subtractive patterning at 212.

Method 200 further comprises (at 214) singulating a photonic integrated circuit (PIC) chip comprising the plurality of coplanar optical waveguides, the first divergent lens surfaces, and a portion of the substrate. For example, the singulating at 214 comprises dicing a semiconductor wafer to form the edges of the PIC chip, wherein one such edge comprises integrated edge-oriented couplers (IECs) which each include a respective lens structure formed at 212.

Additionally or alternatively, method 200 comprises operations to optically couple a PIC chip (such a that formed with the various operations at 210, 212, and 214) to a transverse-oriented lens structure. For example, method 200 further comprises (at 216) coupling the PIC chip over a first region of a package substrate—e.g., wherein such coupling comprises operations adapted from conventional flip-chip, wire bonding and/or other techniques.

Method 200 further comprises (at 218) coupling a lens structure over a second region of the package substrate—e.g., wherein the lens structure is adhered or otherwise bonded to the second region. The lens structure comprises a second divergent surface and a third surface (e.g., a flat surface) which is opposite the second divergent surface. While the PIC chip and the lens structure are coupled to the package substrate, the third surface of the lens structure extends across, and is adjacent to, each of the IECs of the PIC chip. In one such embodiment, a curvature of the second divergent lens surface is in a first plane, wherein respective curvatures of second divergent lens surfaces are each in a second plane which is substantially orthogonal to the first plane.

In various embodiments, the lens structure is coupled to the package substrate independent of the PIC chip. In other embodiments, at least a portion of the lens structure overlaps the PIC chip and/or is otherwise structurally supported at least in part by the PIC chip. For example, in one such embodiment, the PIC forms a stepped structure comprising an upper portion and a lower portion. The upper portion comprises the first divergent lens surfaces of the IECs—e.g., wherein the lower portion, which extends horizontally past the IECs, forms a recess structure which receives a tenon portion formed by the lens structure. By way of illustration and not limitation, the lens structure comprises multiple tenon portions, and the lower portion forms multiple recess structures which each receive a respective one of the tenon portions. In one such embodiment, some or all of the multiple recess structures each extend to a different respective one of the first divergent lens surfaces of the IECs.

In some embodiments, the coupling at 218 is performed concurrently with the coupling at 216. For example, some embodiments optically couple the lens structure to the IECs prior to the singulation at 214. Subsequently, a sub-assembly comprising the PIC chip and the optically coupled lens structure is adhered and/or otherwise coupled to the package substrate at 216 and 218.

Although some embodiments are not limited in this regard, method 200 further comprises (at 220) coupling an array of optical fibers (or alternatively, another PIC chip) each to a respective one of the coplanar IECs via the lens structure. In one such embodiment, method 200 includes or otherwise facilitates communicating one or more optical signals, via the lens structure, between the IECs and the optical fibers.

Figure 3A:
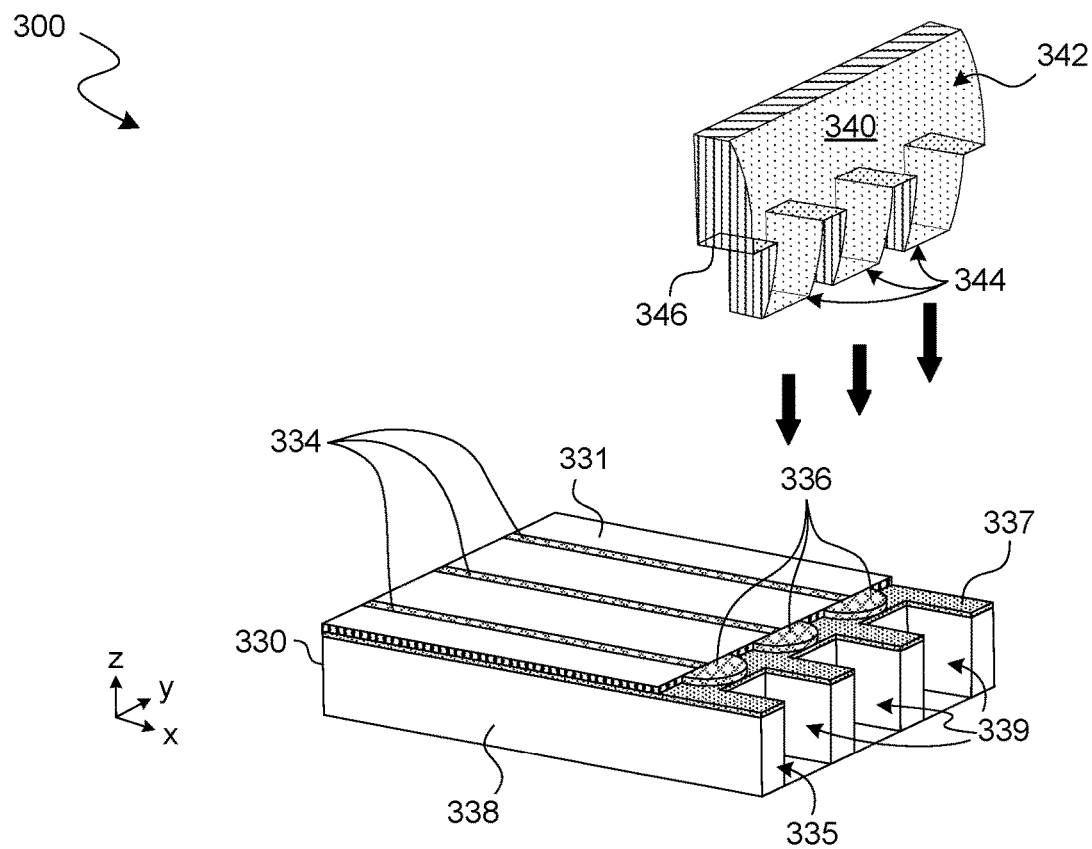
FIGS. 3A, 3B show, in perspective views, stages of an assembly process to provide a photonic device according to an embodiment.
Figure 3B:
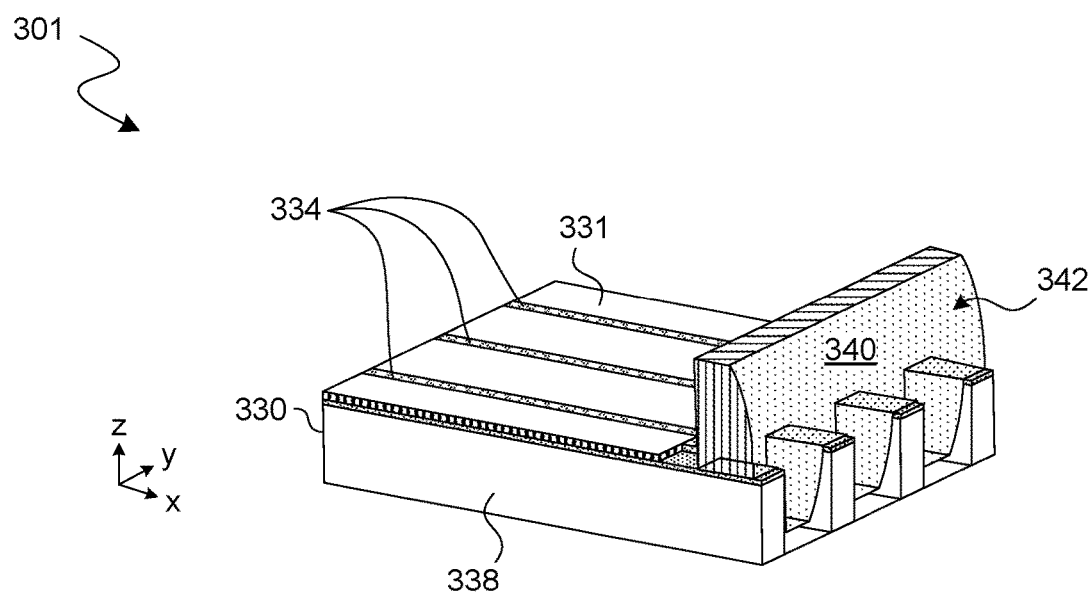

FIGS. 3A, 3B show respective stages of an assembly process to provide an assembly 301 which facilitates optical communications with a PIC chip via a transverse-oriented lens structure according to an embodiment. Assembly 301 illustrates one embodiment wherein a transverse-oriented lens structure forms one or more appendage structures (referred to herein as "tenon portions") which are each to be received by, or otherwise extend into, a respective recess formed by a PIC chip. Assembly 301 provides functionality of device 100 (for example)—e.g., wherein method 200 is to provide functionality of assembly 301.

As shown in FIG. 3A, a lens structure 340 is brought into alignment at stage 300 for coupling with a PIC chip 330. Lens structure 340 comprises a divergent lens surface 342 which is oriented to face away from PIC chip 330—e.g., wherein another surface of lens structure 340 (the other surface opposite divergent lens surface 342) is to be brought into adjacency with IECs 336 of PIC chip 330. Due to said orientation, a curvature—e.g., a greatest curvature—of divergent lens surface 342 is in a vertical plane (in this case, a x-z plane), wherein lens structure 340 is oriented to change a vertical (z-axis) vergence of light.

Although some embodiments are not limited in this regard, PIC chip 330 comprises an underlayer 338 of a semiconductor material, an insulator layer 337 comprising any of various suitable dielectric materials (such as $SiO_2$) over underlayer 338, and an upper layer—e.g., comprising silicon—in which is formed silicon waveguides 334, IECs 336, integrated circuitry (not shown), and/or the like. Portions of the upper layer (and, in some embodiments, the underlayer 338) comprise crystalline silicon and/or any of various other materials suitable to communicate an optical signal. In this example embodiment, IECs 336 extend vertically through a depth of the upper layer to insulator layer 337.

In the example embodiment shown, an edge 335 of PIC chip 330 forms a stepped structure comprising an upper portion and a lower portion. The upper portion of the stepped structure includes respective divergent lens surfaces of IECs 336, wherein the lower portion extends horizontally (e.g., along the x-axis direction shown) past the divergent lens surfaces of IECs 336. The IECs 336 facilitate edge-wise communication of optical signals—via silicon waveguides 334 of PIC chip 330—between lens structure 340 and integrated circuitry (not shown) of PIC chip 330. In one such embodiment, PIC chip 330, and lens structure 340, correspond functionally to PIC chip 130, and lens structure 140 (respectively)—e.g., wherein silicon waveguides 334, edge 335, and IECs 336, correspond functionally to photonic waveguides 134, edge 135, and IECs 136, (respectively).

To facilitate optical coupling of lens structure 340 with PIC chip 330, lens structure 340 forms tenon portions 344, and the lower portion of the stepped structure formed by edge 335 includes recess structures 339 which are each to receive a different respective one of tenon portions 344. In one such embodiment, some or all of the recess structures 339 each extend to the divergent lens surface of a respective one of IECs 336. As shown in FIG. 3B, coupling of lens structure 340 with PIC chip 330 provides a resulting assembly 301, wherein IECs 336 of PIC chip 330 are optically coupled each to lens structure 340.

Figure 4:
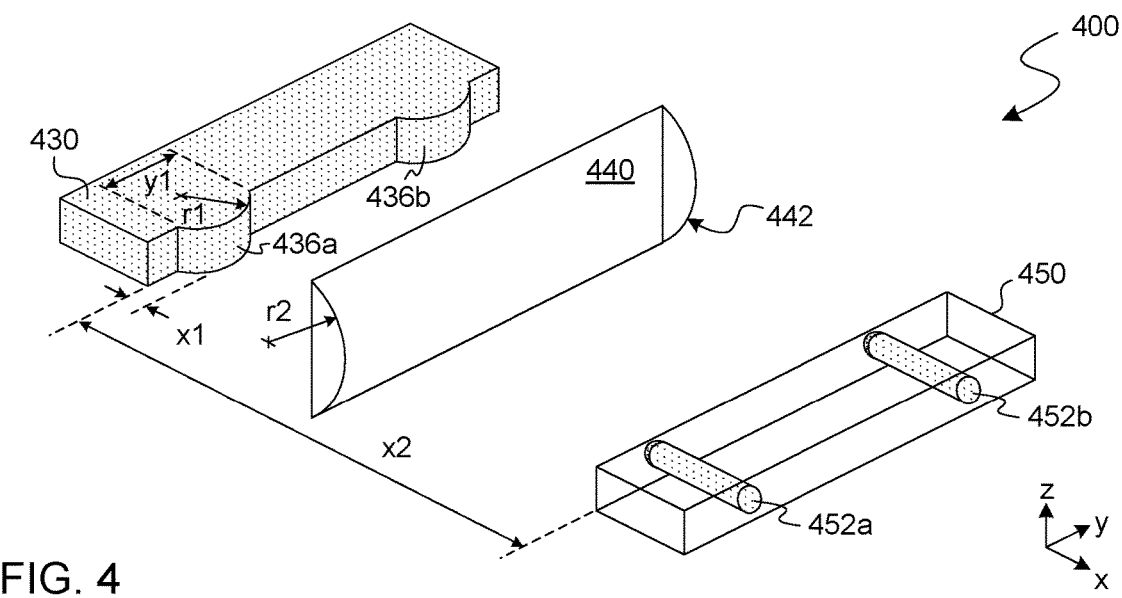
FIG. 4 shows a perspective view of an assembly to provide optical coupling between a PIC and a transverse-oriented lens structure according to an embodiment.

FIG. 4 shows features of an assembly 400 to facilitate optical communications with a PIC chip and a transverse-oriented lens structure according to an embodiment. In various embodiments, assembly 400 provides functionality such as that of device 100—e.g., wherein one or more operations of method 200 are to provide structures of assembly 400.

As shown in FIG. 4, assembly 400 comprises a PIC chip 430, a fiber array housing 450, and a transverse-oriented lens structure 440 which are variously coupled, directly or indirectly, to a substrate (not shown) such as substrate 110. Transverse-oriented lens structure 440 facilitates edge-wise communication of one or more optical signals to and/or from PIC chip—e.g., wherein waveguide preform 440 optically couples optical fibers 452a, 452b, in fiber array housing 450, each to a respective one of IECs 436a, 436b which are variously formed at an edge-facing structure of PIC chip 430. In one such embodiment, PIC chip 430, transverse-oriented lens structure 440, and fiber array housing 450 correspond functionally to PIC chip 130, transverse-oriented lens structure 140, and fiber array housing 150 (respectively)—e.g., wherein IECs 436a, 436b, and optical fibers 452a, 452b correspond functionally to IECs 136, and optical fibers 152 (respectively).

In the example embodiment shown, a length x2 between an edge of PIC chip 430 and fiber array housing 450, is in a range of 0.5 mm to 100 mm—e.g., wherein length x2 is in a range of 1.0 mm to 50 mm (and, in some embodiments, in a range of 1.0 mm to 10 mm). In one such embodiment, an x-axis depth x1 of a curvature of IEC 436a (for example) is in a range of 4 µm to 50 µm—e.g., wherein depth x1 is in a range of 4 µm to 20 µm and, in some embodiments, in a range of 5 µm to 15 µm. By way of illustration and not limitation, a y-axis width y1 of a given one of IECs 436a, 436b is in a range of 20 µm to 200 µm (e.g., in a range of 20 µm to 100 µm and, in some embodiments, in a range of 20 µm to 50 µm). In one such embodiment, IEC 436a forms a convex surface, wherein a radius of curvature r1 of the convex surface is at least 50% of width y1 (e.g., where radius r1 is in a range of 50% to 150% of width y1).

In the example embodiment shown, lens structure 440 comprises a divergent lens surface 442 which faces fiber array housing 450, and a flat side of lens structure 440 (opposite divergent lens surface 442) which extends horizontally across, and is adjacent to, IECs 436a, 436b. Divergent lens surface 442 comprises a convex surface which curves in a vertical (x-z) plane—e.g., wherein a radius of curvature r2 of the convex surface is at least 50% of width y1 (e.g., where radius r2 is in a range of 50% to 150% of width y1). It is appreciated that, in some embodiments, the above described ranges of values for various dimensions of assembly 400 are merely illustrative, and that some or all such ranges may differ in other embodiments, according to implementation-specific details.

Divergent lens surface 442 has a transverse orientation, relative to the respective divergent lens surfaces of IECs 436a, 436b. For example, IECs 436a, 436b each correspond to a respective vergence plane which is horizontal, and lens structure 440 corresponds to another vergence plane which is vertical (i.e., in a y-z plane). In an illustrative scenario according to one embodiment, a first optical signal comprises first light which propagates from PIC chip 430 via IEC 436a, then through lens structure 440 to optical fiber 452a. The first light exhibits divergence in a horizontal (x-y) plane—and additional divergence in a vertical (x-z) plane—as it propagates through the bulk of IEC 436a and toward a divergent lens surface of IEC 436a. As the first light propagates out of PIC chip 430, its horizontal divergence is mitigated by the divergent lens surface of IEC 436a. Due in part to its orientation, the divergent lens surface of IEC 436a is less effective at mitigating the vertical divergence of the first light (as compared to mitigating the horizontal divergence thereof). However, such vertical divergence of the first light is additionally or alternatively mitigated by lens structure 440—e.g., as the first light propagates into lens structure 440 via the side which is adjacent to IECs 436a, 436b and/or as the first light propagates out from divergent lens surface 442 toward optical signal 452a. In various embodiments, such an arrangement of IEC 436a relative to lens structure 440 facilitates beam expansion, mode conversion, and/or other features of communication with the first optical signal.

Additionally or alternatively, a second optical signal comprises second light which propagates from optical fiber 452b, through lens structure 440 and then into PIC chip 430 via IEC 436b. In one such embodiment, the second light needs to undergo a focusing or other convergence—both in a horizontal (x-y) plane, and in a vertical (x-z) plane—in order to accommodate a receiving of the second optical signal by a silicon waveguide (not shown) of PIC chip 430. A vertical convergence of the second light is provided at least in part by lens structure 440—e.g., including a convergence which is induced as the second light propagates into lens structure 440 via divergent lens surface 442. Furthermore, a horizontal convergence of the second light is subsequently provided at least in part by PIC chip 430—e.g., as the second light propagates into the divergent lens surface of IEC 436b. In various embodiments, such an arrangement of IEC 436b relative to lens structure 440 facilitates beam contraction, mode conversion, and/or other features of communication with the second optical signal.

Figures 5A, 5B:
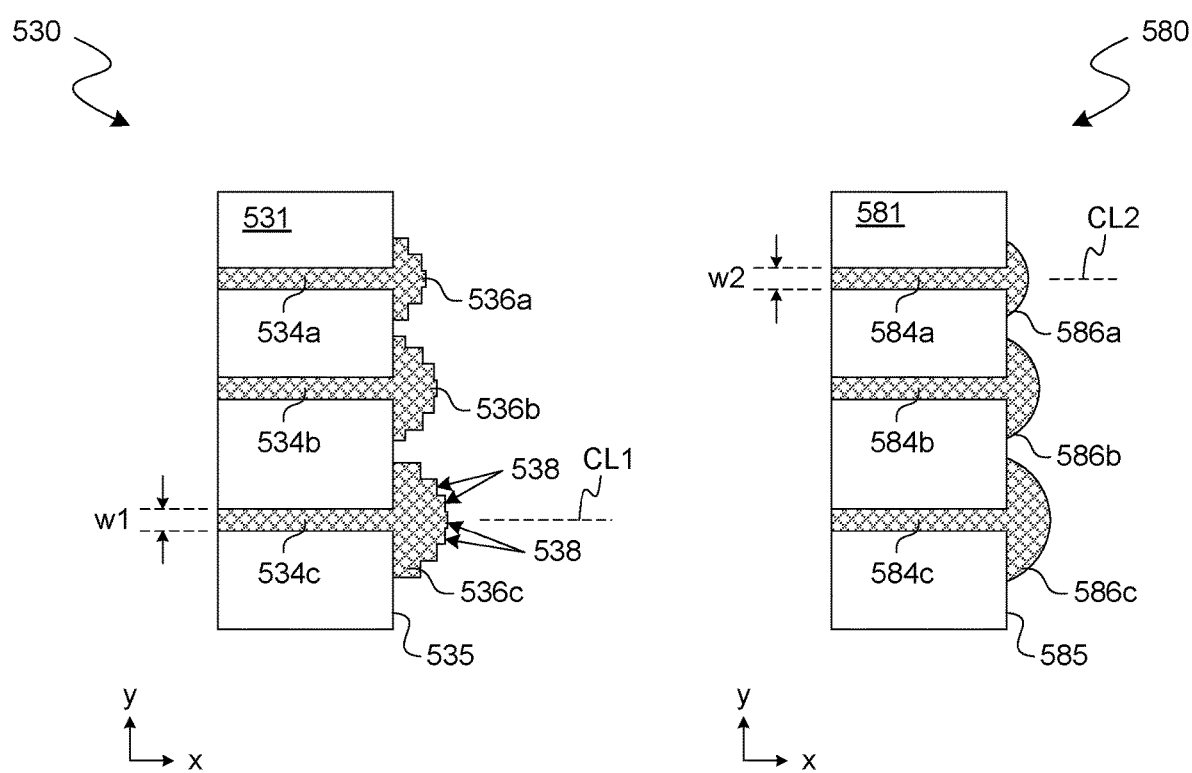
FIGS. 5A, 5B show features of respective PICs each according to a corresponding embodiment.

FIGS. 5A, 5B show features of respective PIC chips 530, 580 which are each to communicate an optical signal with a transverse-oriented lens structure according to a corresponding embodiment. PIC chips 530, 580 variously provide functionality such as that of PIC chip 130—e.g., wherein operations of method 200 are to facilitate optical coupling of a transverse-oriented lens structure with one of PIC chips 530, 580.

As shown in FIG. 5A, a surface 531 of PIC chip 530 has formed therein or thereon silicon waveguides 534a, 534b, 534c that, for example, variously extend from integrated circuitry (not shown)—e.g., including integrated photonic circuitry and, in some embodiments, integrated electrical circuitry—which is formed in or on surface 531. An edge-facing structure 535 of PIC chip 530 forms the respective divergent lens surfaces of IECs 536a, 536b, 536c, which are each at a respective terminus of a corresponding one of silicon waveguides 534a, 534b, 534c. In various embodiments, PIC chip 530 provides functionality of PIC chip 130—e.g., wherein silicon waveguides 534a, 534b, 534c, edge-facing 535, and IECs 536a, 536b, 536c correspond functionally to photonic waveguides 134, edge 135, and IECs 136 (respectively).

PIC chip 530 illustrates one embodiment wherein one or more IECs each form a respective divergent lens surface which is piecewise convex. For example, the divergent lens surface of IEC 536c comprises a plurality of discrete diffractive edge facets 538 which, in some embodiments, are symmetrically distributed about a primary axis CL1 of IEC 536c. In one such embodiment, individual ones of said edge facets 538 are each substantially flat over a transverse (y-axis) length and a longitudinal (z-axis) height of IEC 536c. Additionally or alternatively, the primary axis CL1 of IEC 536c is in a transverse (y-axis) alignment with an optical axis of the corresponding silicon waveguide 534c. In one such embodiment, the divergent lens surface of IEC 536c includes corners (or other such points) which are distributed along a semicylindrical curve, a radius of which is equal to or larger than one half of a (y-axis) width w1 of silicon waveguide 534c.

As shown in FIG. 5B, a surface 581 of PIC chip 580 has formed therein or thereon silicon waveguides 584a, 584b, 584c that, for example, variously extend from integrated circuitry (not shown) which is formed in or on surface 581. An edge-facing 585 of PIC chip 580 forms the respective divergent lens surfaces of IECs 586a, 586b, 586c, at the respective termini of silicon waveguides 584a, 584b, 584c. In various embodiments, PIC chip 580 provides functionality of PIC chip 130—e.g., wherein silicon waveguides 584a, 584b, 584c, edge-facing 585, and IECs 586a, 586b, 586c correspond functionally to photonic waveguides 134, edge 135, and IECs 136 (respectively).

PIC chip 580 illustrates one embodiment wherein one or more IECs each form a respective convex lens surface. For example, IEC 586a forms a convex lens surface which is symmetrical about a primary axis CL2. In one such embodiment, the primary axis CL2 of IEC 586a is in a transverse (y-axis) alignment with an optical axis of the corresponding silicon waveguide 584a. Additionally or alternatively, the convex surface of IEC 586a conforms to a semicylindrical curve, a radius of which is equal to or larger than one half of a (y-axis) width w2 of silicon waveguide 584a.

Figure 6A:
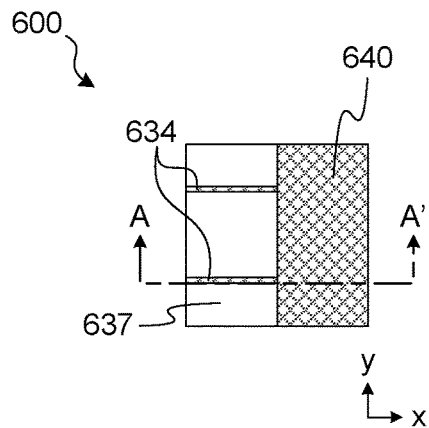
FIGS. 6A through 6F show cross-sectional views each of a respective stage of processing to provide cylindrical lenses of a PIC according to an embodiment.
Figure 6B:
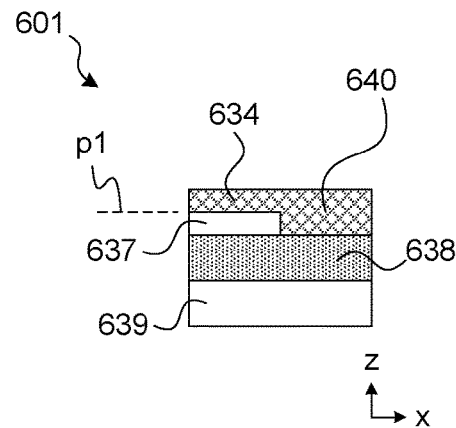
Figure 6C:
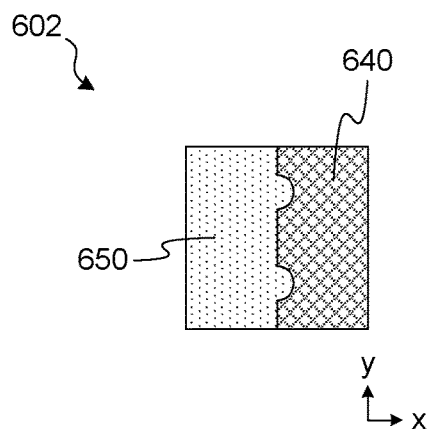
Figure 6D:
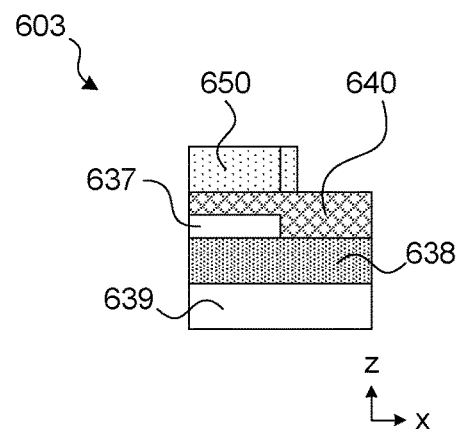
Figure 6E:
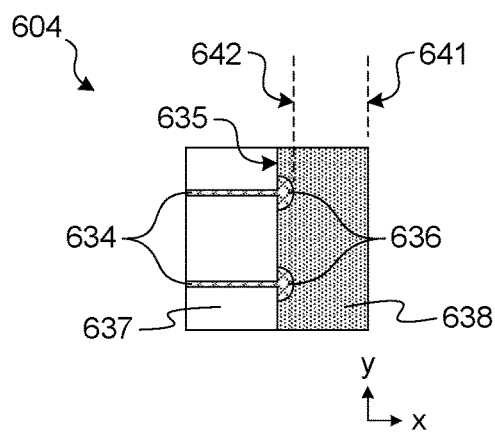
Figure 6F:
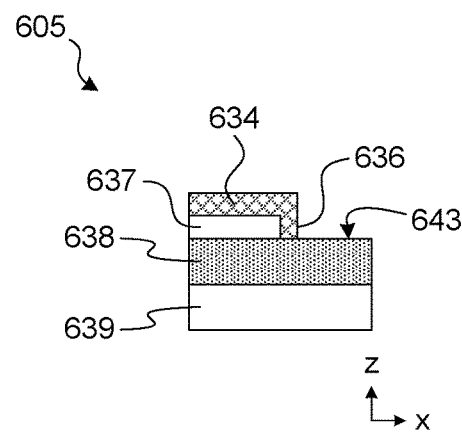

FIGS. 6A, 6C, 6E show various structures during respective stages 600, 602, 604 of processing to fabricate IECs of a PIC chip according to an embodiment. Processing such as that illustrated by stages 600, 602, 604 is performed, for example, to provide structures of one of PIC chips 130, 330, 430, 530, or 580—e.g., wherein operations of method 200 include or are otherwise based on some or all such processing. The various structures in stages 600, 602, 604 are also shown by the respective cross-sectional side views 601, 603, 605 in FIGS. 6B, 6D, 6F (respectively). The cross-sections for side views 601, 603, 605 correspond to the line A-A' shown.

As shown in FIG. 6A, structures at stage 600 are formed by processing of a SOI wafer which comprises an underlayer 639 of a semiconductor material, an insulator layer 638 comprising any of various suitable dielectric materials (such as $SiO_2$) over underlayer 639, and an upper layer 637 of a material which (for example) comprises silicon. Some or all of upper layer 637 (and, in some embodiments, the underlayer 639) comprises crystalline silicon and/or any of various other materials suitable to communicate an optical signal.

At stage 600, photonic waveguide structures (such as the illustrative silicon waveguides 634 shown) are formed in or on layer 637—e.g., where such forming includes any of various suitable wet or dry etching techniques, any of various lithographic processes, or other patterning processes such as ablation, ruling, or the like. In one such embodiment, silicon waveguides 634 are rib waveguide structures formed by patterned etching of crystalline silicon in a material layer above a horizontal (x-y) plane p1 which extends in or on layer 637. Silicon waveguides 634 variously extend to a body of a material 640 which (for example) comprises crystalline silicon or any of various other materials which are suitable to communicate an optical signal. At stage 600 (or alternatively, at a later processing stage), silicon waveguides 634 further extend variously between material 640 and integrated circuitry (not shown)—e.g., including integrated photonic circuitry and, in some embodiments, integrated electrical circuitry—which is formed in or on layer 637. In various embodiments, material 640 has a same composition as a material of silicon waveguides 634.

As shown in FIG. 6C, a patterned mask 650 is formed at stage 602 on structures which are variously formed in or on layer 637—e.g., the structures including silicon waveguides 634, and portions of material 640. In an embodiment, some portions of patterned mask 650—which extend over material 640—comprise various concave or otherwise divergent profiles, which are to facilitate the formation of IEC structures.

As shown in FIG. 6E, structures at stage 604 are formed by an etch process, after which the patterned mask 650 is removed from silicon waveguides 634 and/or from other structures which are formed in or on layer 637. In some embodiments, the etch process—e.g., comprising deep reactive ion etching (DRIE)—selectively removes portions of material 640, wherein remaining portions of material 640 form IECs 636 which are at an edge portion of layer 637, and which are each at a respective termini of a corresponding one of silicon waveguides 634.

In this example embodiment, IECs 636 extend vertically to insulator layer 638—e.g., wherein the etch process exposes a surface 643 of insulator layer 638 (for example). IECs 636 forms one or more divergent lens profiles, wherein a maximum horizontal (x-axis) extent of said lens profiles is indicated by the vertical plane 642 (i.e., an y-z plane) shown. In various embodiments, subsequent singulation forms a PIC chip which comprises the structures shown in view 605. For example, an edge of the singulated PIC chip forms a stepped structure comprising an upper portion and a lower portion. In one such embodiment, the upper portion, which is above surface 643, comprises the respective divergent lens profiles of IECs 636—e.g., wherein the lower portion is below surface 643, and extends horizontally past vertical plane 642 to another vertical plane 641. As described herein, the lower portion provides support for, and/or facilitates alignment with, a transverse-oriented lens structure that is to be optically coupled with IECs 636, in some embodiments.

Figure 7:
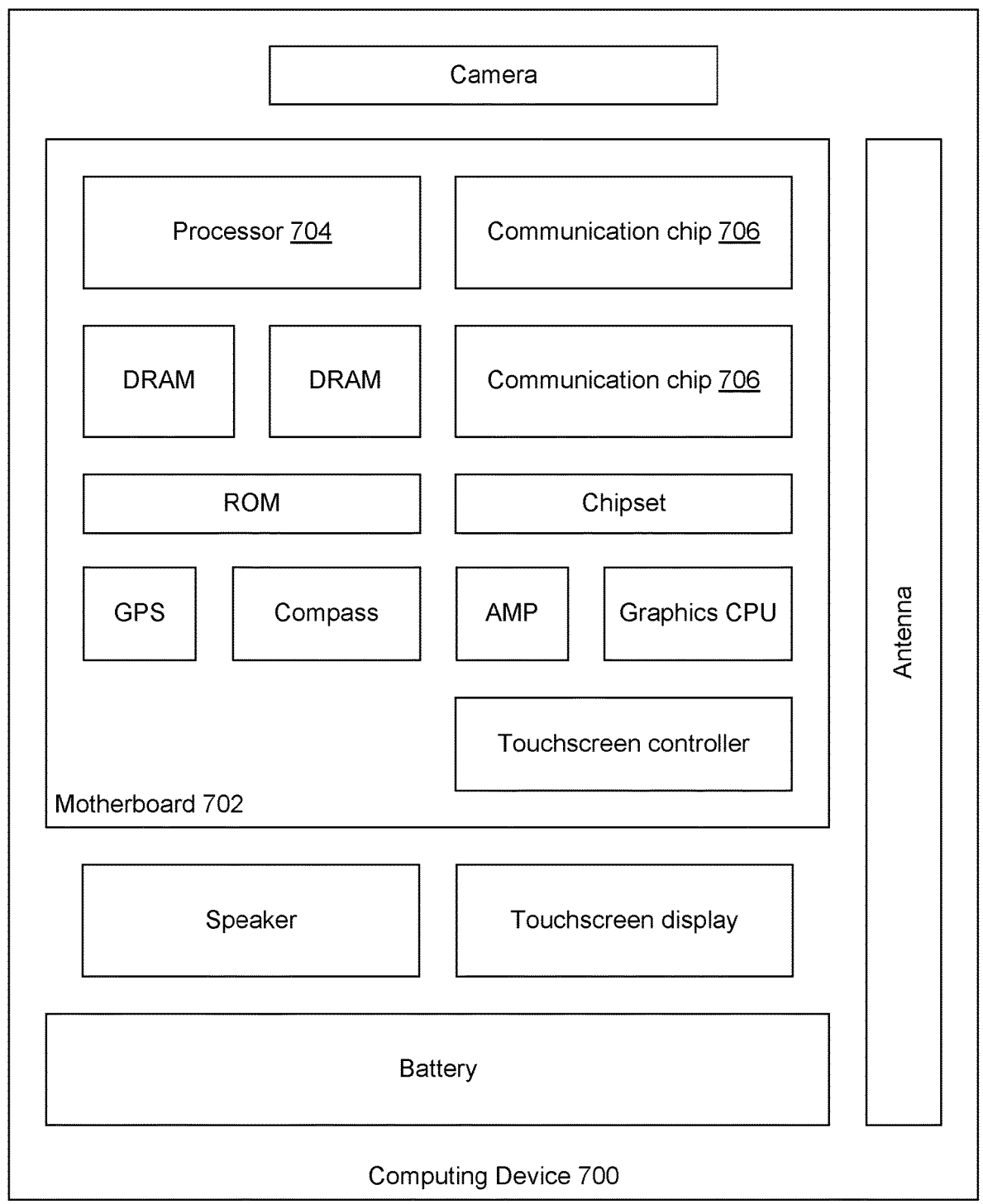
FIG. 7 is a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
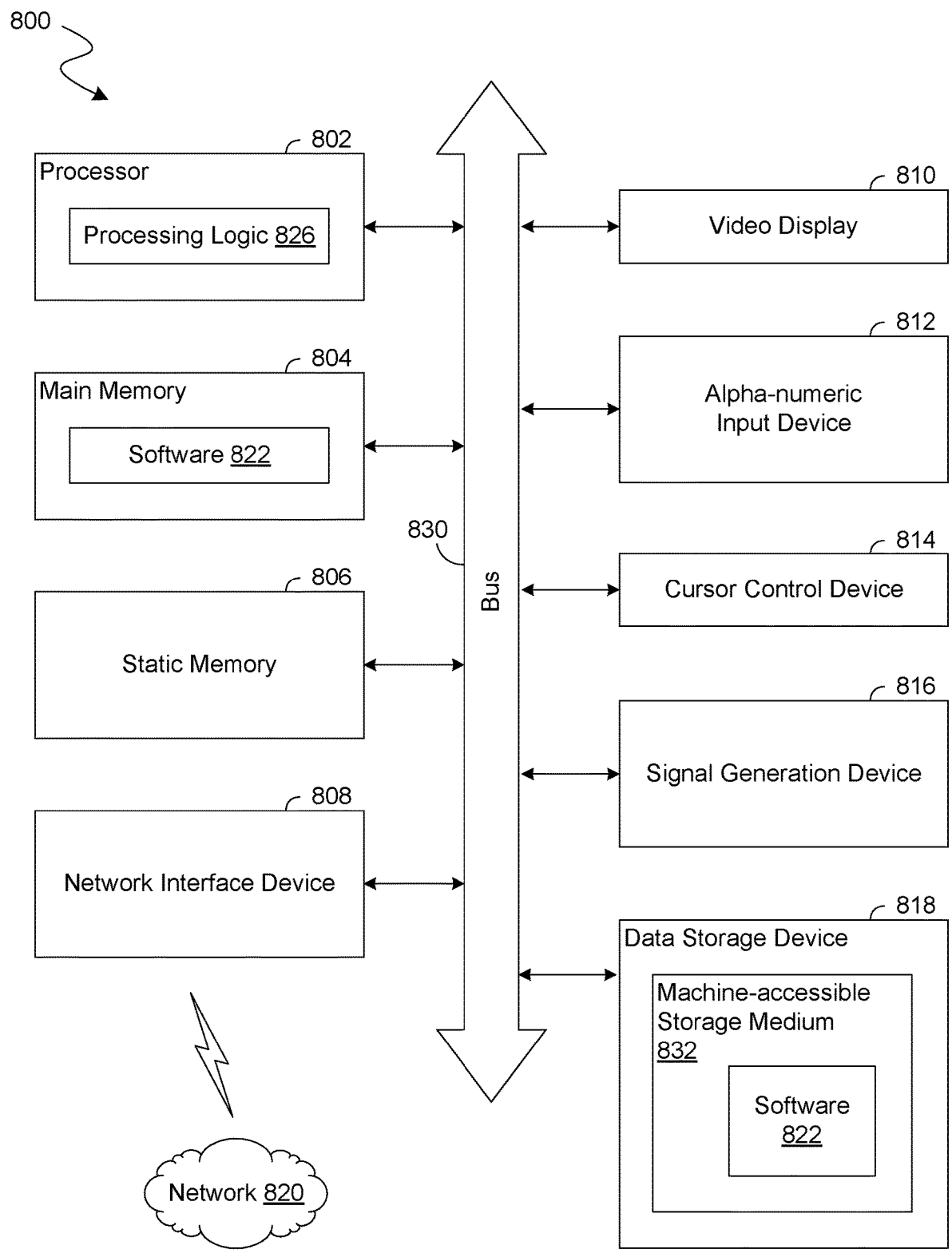
FIG. 8 is a functional block diagram illustrating an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one or more first embodiments, a photonic device comprises a package substrate, a lens structure which extends over a first region of the package substrate, the lens structure comprising a first divergent surface and a second surface on opposite respective sides of the lens structure, and a photonic integrated circuit (PIC) chip which extends over a second region of the package substrate, the PIC chip comprising a plurality of coplanar photonic waveguides, and a plurality of coplanar integrated edge-oriented couplers (IECs) each comprising a respective one of second divergent lens surfaces, wherein individual ones of the coplanar photonic waveguides each terminate at a respective one of the plurality of coplanar IECs, wherein the lens structure extends across, and is adjacent to, each of the plurality of coplanar IECs, wherein a curvature of the first divergent lens surface is in a first plane, and wherein respective curvatures of second divergent lens surfaces are each in a second plane which is substantially orthogonal to the first plane.

In one or more second embodiments, further to the first embodiment, the photonic device further comprises a support structure which is integrated with the lens structure, the support structure comprising a base portion by which the support structure is coupled to the package substrate.

In one or more third embodiments, further to the first embodiment or the second embodiment, a the lens structure is coupled to the package substrate independent of the PIC chip.

In one or more fourth embodiments, further to any of the first through third embodiments, a one of the second divergent lens surfaces comprises a plurality of discrete diffractive edge facets symmetrically distributed about a primary axis of the one of the second divergent lens surfaces, and wherein individual ones of the edge facets are substantially flat.

In one or more fifth embodiments, further to any of the first through fourth embodiments, a one of the second divergent lens surfaces is substantially semicylindrical.

In one or more sixth embodiments, further to any of the first through fifth embodiments, a the PIC chip comprises a first substrate comprising a semiconductor material, wherein the second divergent lens surfaces each extend a respective depth into the first substrate.

In one or more seventh embodiments, further to the sixth embodiment, the semiconductor material is silicon, and the first substrate comprises an underlayer and a layer of silicon dioxide between the silicon and the underlayer.

In one or more eighth embodiments, further to the seventh embodiment, the second divergent lens surfaces each stop at the layer of silicon dioxide.

In one or more ninth embodiments, a photonic device comprises a package substrate, a lens structure comprising a first divergent surface and a second surface on opposite respective sides of the lens structure, wherein the lens structure comprises a tenon portion, a photonic integrated circuit (PIC) chip comprising a plurality of coplanar integrated edge-oriented couplers (IECs) each comprising a respective one of second divergent lens surfaces, wherein the lens structure extends across, and is adjacent to, each of the plurality of coplanar IECs, wherein a curvature of the first divergent lens surface is in a first plane, and wherein respective curvatures of second divergent lens surfaces are each in a second plane which is substantially orthogonal to the first plane, wherein the PIC forms a stepped structure comprising an upper portion comprising the second divergent lens surfaces, and a lower portion which extends past the plurality of coplanar IECs and forms a recess structure, wherein the tenon portion extends into the recess structure.

In one or more tenth embodiments, further to the ninth embodiment, the tenon portion is a first tenon portion, the recess structure is a first recess structure, the lens structure comprises multiple tenon portions comprising the first tenon portion, the lower portion forms multiple recess structures comprising the first recess structure, and the multiple tenon portions each extend into a respective one of the multiple recess structures.

In one or more eleventh embodiments, further to the tenth embodiment, the multiple recess structures each extend to a different respective one of the second divergent lens surfaces.

In one or more twelfth embodiments, further to the ninth embodiment or the tenth embodiment, aone of the second divergent lens surfaces comprises a plurality of discrete diffractive edge facets symmetrically distributed about a primary axis of the one of the second divergent lens surfaces, and wherein individual ones of the edge facets are substantially flat.

In one or more thirteenth embodiments, further to any of the ninth through tenth embodiments, aone of the second divergent lens surfaces is substantially semicylindrical.

In one or more fourteenth embodiments, further to any of the ninth through tenth embodiments, athe PIC chip comprises a first substrate comprising a semiconductor material, wherein the second divergent lens surfaces each extend a respective depth into the first substrate.

In one or more fifteenth embodiments, further to the fourteenth embodiment, the semiconductor material is silicon, and the first substrate comprises an underlayer and a layer of silicon dioxide between the silicon and the underlayer.

In one or more sixteenth embodiments, further to the fifteenth embodiment, the second divergent lens surfaces each stop at the layer of silicon dioxide.

In one or more seventeenth embodiments, further to any of the ninth through tenth embodiments, the PIC chip further comprises a plurality of coplanar photonic waveguides, wherein individual ones of the plurality of coplanar photonic waveguides each terminate at a respective one of the plurality of coplanar IECs.

In one or more eighteenth embodiments, a system comprises a packaged device comprising a package substrate, a lens structure coupled to the package substrate, the lens structure comprising a first divergent surface and a second surface on opposite respective sides of the lens structure, a photonic integrated circuit (PIC) chip coupled to the package substrate, the PIC chip comprising a plurality of coplanar integrated edge-oriented couplers (IECs) each comprising a respective one of second divergent lens surfaces, wherein the lens structure extends across, and is adjacent to, each of the plurality of coplanar IECs, and a curvature of the first divergent lens surface is in a first plane, and respective curvatures of second divergent lens surfaces are each in a second plane which is substantially orthogonal to the first plane, a connector coupled to the packaged device, the connector comprising an array of optical fibers each optically coupled, via the lens structure, to a respective IEC of the plurality of coplanar IECs, and a printed circuit board coupled to the packaged circuit device.

In one or more nineteenth embodiments, further to the eighteenth embodiment, the lens structure comprises a tenon portion, the PIC forms a stepped structure comprising an upper portion comprising the second divergent lens surfaces, and a lower portion which extends past the plurality of coplanar IECs and forms a recess structure, and the tenon portion extends into the recess structure.

In one or more twentieth embodiments, further to the nineteenth embodiment, the tenon portion is a first tenon portion, the recess structure is a first recess structure, the lens structure comprises multiple tenon portions comprising the first tenon portion, the lower portion forms multiple recess structures comprising the first recess structure, and the multiple tenon portions each extend into a respective one of the multiple recess structures.

In one or more twenty-first embodiments, further to the twentieth embodiment, the multiple recess structures each extend to a different respective one of the second divergent lens surfaces.

In one or more twenty-second embodiments, further to the eighteenth embodiment or the nineteenth embodiment, the packaged device further comprises a support structure which is integrated with the lens structure, the support structure comprising a base portion by which the support structure is coupled to the package substrate.

In one or more twenty-third embodiments, further to any of the eighteenth through nineteenth embodiments, the lens structure is coupled to the package substrate independent of the PIC chip.

In one or more twenty-fourth embodiments, further to any of the eighteenth through nineteenth embodiments, one of the second divergent lens surfaces comprises a plurality of discrete diffractive edge facets symmetrically distributed about a primary axis of the one of the second divergent lens surfaces, and wherein individual ones of the edge facets are substantially flat.

In one or more twenty-fifth embodiments, further to any of the eighteenth through nineteenth embodiments, one of the second divergent lens surfaces is substantially semicylindrical.

In one or more twenty-sixth embodiments, further to any of the eighteenth through nineteenth embodiments, the PIC chip further comprises a plurality of coplanar photonic waveguides, wherein individual ones of the plurality of coplanar photonic waveguides each terminate at a respective one of the plurality of coplanar IECs.

In one or more twenty-seventh embodiments, a method comprises receiving a package substrate, coupling a lens structure to the package substrate, the lens structure comprising a first divergent surface and a second surface on opposite respective sides of the lens structure, and coupling a photonic integrated circuit (PIC) chip to the package substrate, the PIC chip comprising a plurality of coplanar integrated edge-oriented couplers (IECs) each comprising a respective one of second divergent lens surfaces, wherein the lens structure extends across, and is adjacent to, each of the plurality of coplanar IECs, and a curvature of the first divergent lens surface is in a first plane, and respective curvatures of second divergent lens surfaces are each in a second plane which is substantially orthogonal to the first plane.

In one or more twenty-eighth embodiments, further to the twenty-seventh embodiment, the lens structure is coupled to the package substrate independent of the PIC chip.

In one or more twenty-ninth embodiments, further to the twenty-seventh embodiment or the twenty-eighth embodiment, one of the second divergent lens surfaces comprises a plurality of discrete diffractive edge facets symmetrically distributed about a primary axis of the one of the second divergent lens surfaces, and wherein individual ones of the edge facets are substantially flat.

In one or more thirtieth embodiments, further to any of the twenty-seventh through twenty-ninth embodiments, one of the second divergent lens surfaces is substantially semicylindrical.

In one or more thirty-first embodiments, further to any of the twenty-seventh through twenty-ninth embodiments, the lens structure comprises a tenon portion, the PIC forms a stepped structure comprising an upper portion comprising the second divergent lens surfaces, and a lower portion which extends past the plurality of coplanar IECs and forms a recess structure, and the tenon portion extends into the recess structure.

In one or more thirty-second embodiments, further to the thirty-first embodiment, the tenon portion is a first tenon portion, the recess structure is a first recess structure, the lens structure comprises multiple tenon portions comprising the first tenon portion, the lower portion forms multiple recess structures comprising the first recess structure, and the multiple tenon portions each extend into a respective one of the multiple recess structures.

In one or more thirty-third embodiments, further to the thirty-second embodiment, the multiple recess structures each extend to a different respective one of the second divergent lens surfaces.

In one or more thirty-fourth embodiments, further to any of the twenty-seventh through twenty-ninth embodiments, one of the second divergent lens surfaces comprises a plurality of discrete diffractive edge facets symmetrically distributed about a primary axis of the one of the second divergent lens surfaces, and wherein individual ones of the edge facets are substantially flat.

In one or more thirty-fifth embodiments, further to any of the twenty-seventh through twenty-ninth embodiments, one of the second divergent lens surfaces is substantially semicylindrical.

In one or more thirty-sixth embodiments, further to any of the twenty-seventh through twenty-ninth embodiments, the PIC chip further comprises a plurality of coplanar photonic waveguides, wherein individual ones of the plurality of coplanar photonic waveguides each terminate at a respective one of the plurality of coplanar IECs.

In one or more thirty-seventh embodiments, further to any of the twenty-seventh through twenty-ninth embodiments, the method further comprises patterning a plurality of coplanar optical waveguides into a thickness of a material over a plane of a wafer, subtractively patterning the second divergent lens surfaces each at a terminus of a respective one of the plurality of coplanar optical waveguides, wherein the second divergent lens surfaces are each substantially flat over at least the thickness, and singulating the wafer to form the PIC chip, wherein the PIC chip further comprises the plurality of coplanar optical waveguides.

Techniques and architectures for optically coupling a photonic integrated circuit with optical fibers via a lens structure are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A photonic device comprising:
   a package substrate;
   a lens structure which extends over a first region of the package substrate, the lens structure comprising a first divergent surface and a second surface on opposite respective sides of the lens structure; and
   a photonic integrated circuit (PIC) chip which extends over a second region of the package substrate, the PIC chip comprising:
      a plurality of coplanar photonic waveguides; and
      a plurality of coplanar integrated edge-oriented couplers (IECs) each comprising a respective one of second divergent lens surfaces, wherein individual ones of the coplanar photonic waveguides each terminate at a respective one of the plurality of coplanar IECs;
   wherein the lens structure extends across, and is adjacent to, each of the plurality of coplanar IECs;
   wherein a light transmissive material of the lens structure forms tenon portions, and wherein the first divergent surface forms respective sides of the tenon portions;
   wherein a curvature of the first divergent surface is in a first plane; and
   wherein respective curvatures of the second divergent lens surfaces are each in a second plane which is substantially orthogonal to the first plane.

2. The photonic device of claim 1, wherein one of the second divergent lens surfaces comprises a plurality of discrete diffractive edge facets symmetrically distributed about a primary axis of the one of the second divergent lens surfaces, and wherein individual ones of the edge facets are substantially flat.

3. The photonic device of claim 1, wherein one of the second divergent lens surfaces is substantially semicylindrical.

4. The photonic device of claim 1, wherein the PIC chip comprises a first substrate comprising a semiconductor material, wherein the second divergent lens surfaces each extend a respective depth into the first substrate.

5. The photonic device of claim 4, wherein the semiconductor material is silicon, and the first substrate comprises an underlayer and a layer of silicon dioxide between the silicon and the underlayer.

6. The photonic device of claim 5, wherein the second divergent lens surfaces each stop at the layer of silicon dioxide.

7. A photonic device comprising:
   a package substrate;
   a lens structure comprising a first divergent surface and a second surface on opposite respective sides of the lens structure, wherein a light transmissive material of the lens structure forms a tenon portion, and wherein the first divergent surface forms a side of the tenon portion;
   a photonic integrated circuit (PIC) chip comprising a plurality of coplanar integrated edge-oriented couplers (IECs) each comprising a respective one of second divergent lens surfaces;
   wherein the lens structure extends across, and is adjacent to, each of the plurality of coplanar IECs;
   wherein a curvature of the first divergent surface is in a first plane;
   wherein respective curvatures of the second divergent lens surfaces are each in a second plane which is substantially orthogonal to the first plane; and
   wherein the PIC forms a stepped structure comprising:
      an upper portion comprising the second divergent lens surfaces; and
      a lower portion which extends past the plurality of coplanar IECs and forms a recess structure, wherein the tenon portion extends into the recess structure.

8. The photonic device of claim 7, wherein:
   the tenon portion is a first tenon portion;
   the recess structure is a first recess structure;
   the lens structure comprises multiple tenon portions comprising the first tenon portion;
   the first divergent surface forms respective sides of the multiple tenon portions;
   the lower portion forms multiple recess structures comprising the first recess structure; and
   the multiple tenon portions each extend into a respective one of the multiple recess structures.

9. The photonic device of claim 8, wherein the multiple recess structures each extend to a different respective one of the second divergent lens surfaces.

10. The photonic device of claim 7, wherein one of the second divergent lens surfaces comprises a plurality of discrete diffractive edge facets symmetrically distributed about a primary axis of the one of the second divergent lens surfaces, and wherein individual ones of the edge facets are substantially flat.

11. The photonic device of claim 7, wherein one of the second divergent lens surfaces is substantially semicylindrical.

12. The photonic device of claim 7, the PIC chip further comprising:
   a plurality of coplanar photonic waveguides, wherein individual ones of the plurality of coplanar photonic waveguides each terminate at a respective one of the plurality of coplanar IECs.

13. A system comprising:
   a packaged device comprising:
      a package substrate;
      a lens structure coupled to the package substrate, the lens structure comprising a first divergent surface and a second surface on opposite respective sides of the lens structure;
      a photonic integrated circuit (PIC) chip coupled to the package substrate, the PIC chip comprising a plurality of coplanar integrated edge-oriented couplers (IECs) each comprising a respective one of second divergent lens surfaces;
      wherein the lens structure extends across, and is adjacent to, each of the plurality of coplanar IECs;
      wherein a light transmissive material of the lens structure forms a tenon portion, and
      wherein the first divergent surface forms a side of the tenon portion;
      wherein a curvature of the first divergent surface is in a first plane; and
      wherein respective curvatures of the second divergent lens surfaces are each in a second plane which is substantially orthogonal to the first plane;
   a connector coupled to the packaged device, the connector comprising an array of optical fibers each optically coupled, via the lens structure, to a respective IEC of the plurality of coplanar IECs; and a printed circuit board coupled to the packaged device.

14. The system of claim 13, wherein the PIC forms a stepped structure comprising:
- an upper portion comprising the second divergent lens surfaces; and
- a lower portion which extends past the plurality of coplanar IECs and forms a recess structure; and the tenon portion extends into the recess structure.

15. The system of claim 14, wherein:
the tenon portion is a first tenon portion;
the recess structure is a first recess structure;
the lens structure comprises multiple tenon portions comprising the first tenon portion;
the first divergent surface forms respective sides of the multiple tenon portions;
the lower portion forms multiple recess structures comprising the first recess structure; and
the multiple tenon portions each extend into a respective one of the multiple recess structures.

16. The system of claim 15, wherein the multiple recess structures each extend to a different respective one of the second divergent lens surfaces.

\* \* \* \* \*